(12) United States Patent
Henkel et al.

(10) Patent No.: US 11,745,814 B2
(45) Date of Patent: Sep. 5, 2023

(54) TRANSPORT SYSTEM

(71) Applicant: Honda Motor Co., Ltd., Tokyo (JP)

(72) Inventors: Charles A Henkel, Dublin, OH (US);
Tim A Wilson, Urbana, OH (US);
Donald K Ingles, LaRue, OH (US);
Karl Angerman, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 17/363,332

(22) Filed: Jun. 30, 2021

(65) Prior Publication Data

US 2023/0001995 A1 Jan. 5, 2023

(51) Int. Cl.
*B62D 65/02* (2006.01)
*B60P 7/08* (2006.01)
*B60P 3/07* (2006.01)

(52) U.S. Cl.
CPC ............. *B62D 65/022* (2013.01); *B60P 3/07* (2013.01); *B60P 7/0815* (2013.01)

(58) Field of Classification Search
CPC ........ B62D 65/022; B60P 3/07; B60P 7/0815; B60P 1/649; B65G 69/22
USPC ......................................... 414/477, 537, 679
See application file for complete search history.

(56) References Cited

U.S. PATENT DOCUMENTS

| | | | | |
|---|---|---|---|---|
| 2,916,169 A * | 12/1959 | De Witt | ............... | B60P 1/38 414/528 |
| 4,009,792 A * | 3/1977 | Sano | ............... | B60P 1/64 414/512 |
| 5,529,454 A | 6/1996 | Alm et al. | | |
| 6,099,232 A | 8/2000 | Dixon et al. | | |
| 6,413,033 B1 | 7/2002 | Monroig, Jr. | | |
| 6,524,056 B1 | 2/2003 | Kloster | | |
| 6,767,171 B2 | 7/2004 | Kelly | | |
| 11,254,254 B2 * | 2/2022 | Cochrane | ............... | B60P 1/4414 |
| 2006/0231517 A1 * | 10/2006 | Bothun | ............... | E04H 1/00 211/151 |
| 2010/0086386 A1 | 4/2010 | Freeman | | |
| 2012/0055368 A1 * | 3/2012 | Heyden | ............... | B61K 7/20 104/257 |
| 2017/0036872 A1 | 2/2017 | Wallace et al. | | |
| 2019/0351801 A1 | 11/2019 | Rousselle | | |

FOREIGN PATENT DOCUMENTS

| | | |
|---|---|---|
| CN | 110254337 A | 9/2019 |
| DE | 202010013520 U1 | 11/2010 |
| KR | 200475578 Y1 | 12/2014 |
| SE | 8303682 L | 12/1984 |
| WO | 2017129959 A1 | 8/2017 |

\* cited by examiner

*Primary Examiner* — Lynn E Schwenning
(74) *Attorney, Agent, or Firm* — Joshua Freier; American Honda Motor Co., Inc.

(57) ABSTRACT

A transport system for transporting a vehicle body at a manufacturing plant is provided. The transport system includes a guide rail attached to a floor of a trailer of a truck and includes a pair of elongated channels defining an elongated passage therebetween. The transport system further includes a carriage adapted to support the vehicle body and configured to facilitate a transfer of the vehicle body to the trailer. The carriage includes at least one guide pin configured to engage with the guide rail and adapted to be arranged inside the elongated passage. The at least one guide pin guides a movement of the carriage along the guide rail.

11 Claims, 6 Drawing Sheets

ND SYSTEM

BACKGROUND

The disclosed subject matter relates generally to a transport system. More particularly, the disclosed subject matter relates to a transport having features to transport a vehicle body at a manufacturing plant.

Current production of vehicles requires a movement of white body units (frame and closures only) from one location to another location to complete paint, assembly and finishing processes. Transportation is accomplished using enclosed semi-trailers and ratchet straps to hold the white body units in place. However, each white body unit has to be carefully guided into the trailer to avoid any bumping of white body unit to the sides of the trailer. Additionally, the white body unit is attached to the trailer by using a plurality of straps, which is a time-consuming process. Further, transportation of the white body unit to the trailer and attachment of the white body unit to the trailer requires at least two persons, and hence is a labour-intensive task.

It would therefore be desirable to provide a transport system that enables transportation of the white body units inside the trailer that prevents a damage to the white body units. It would also be desirable to provide a transport system that reduces the time needed to transfer and attach white body units with the trailer and is labor intensive.

SUMMARY

In accordance with one embodiment of the present disclosure, a transport system for transporting a vehicle body at a manufacturing plant is provided. The transport system includes a guide rail attached to a floor of a trailer of a truck and includes a pair of elongated channels defining an elongated passage therebetween. The transport system further includes a carriage adapted to support the vehicle body and configured to facilitate a transfer of the vehicle body to the trailer. The carriage includes at least one guide pin configured to engage with the guide rail and adapted to be arranged inside the elongated passage. The at least one guide pin guides a movement of the carriage along the guide rail.

In accordance with another embodiment of the present disclosure, a transport system for transporting a vehicle body at a manufacturing plant is provided. The transport system includes a trailer including a floor, and a guide rail attached to the floor of the trailer and including a pair of elongated channels defining an elongated passage therebetween. The transport system further includes a carriage adapted to support the vehicle body and configured to facilitate a transfer of the vehicle body to the trailer. The carriage includes at least one guide pin configured to engage with the guide rail and is adapted to be arranged inside the elongated passage. The at least one guide pin guides a movement of the carriage along the guide rail. Moreover, the transport system includes a first stopper adapted to be removably coupled with the guide rail and configured to engage with the carriage to restrict the movement of the carriage in a first direction along the length of the guide rail. The first stopper is adapted to be partially arranged inside the elongated passage. The transport system furthermore includes a second stopper adapted to be removably coupled with the guide rail and configured to engage with the carriage to restrict the movement of the carriage in a second direction, opposite to the first direction, along the length of the guide rail. The second stopper is adapted to be partially arranged inside the elongated passage.

In accordance with yet a further embodiment of the present disclosure, a method for transporting a vehicle body at a manufacturing plant is disclosed. The method includes providing a trailer having a guide rail attached to a floor of the trailer. The guide rail includes a pair of elongated channels defining an elongated passage therebetween. The method further includes providing a carriage to support the vehicle body and to facilitate a transfer of the vehicle body to the trailer. The carriage includes at least one guide pin configured to engage with the guide rail and adapted to be arranged inside the elongated passage. The at least one guide pin guides a movement of the carriage along the guide rail. The method also includes mounting the vehicle body on the carriage and positioning the carriage along with the vehicle body inside the trailer by moving the carriage on the trailer such that the at least one guide pin engages with the guide rail and is arranged inside the elongated passage. Moreover, the method includes engaging the first stopper with the guide rail and the carriage to prevent the movement of the carriage in a first direction along the length of the guide rail, and engaging the second stopper with the guide rail and the carriage to prevent the movement of the carriage in a second direction opposite to the first direction.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-6, wherein like numbers indicate the same or corresponding elements throughout the views.

Figure 1:
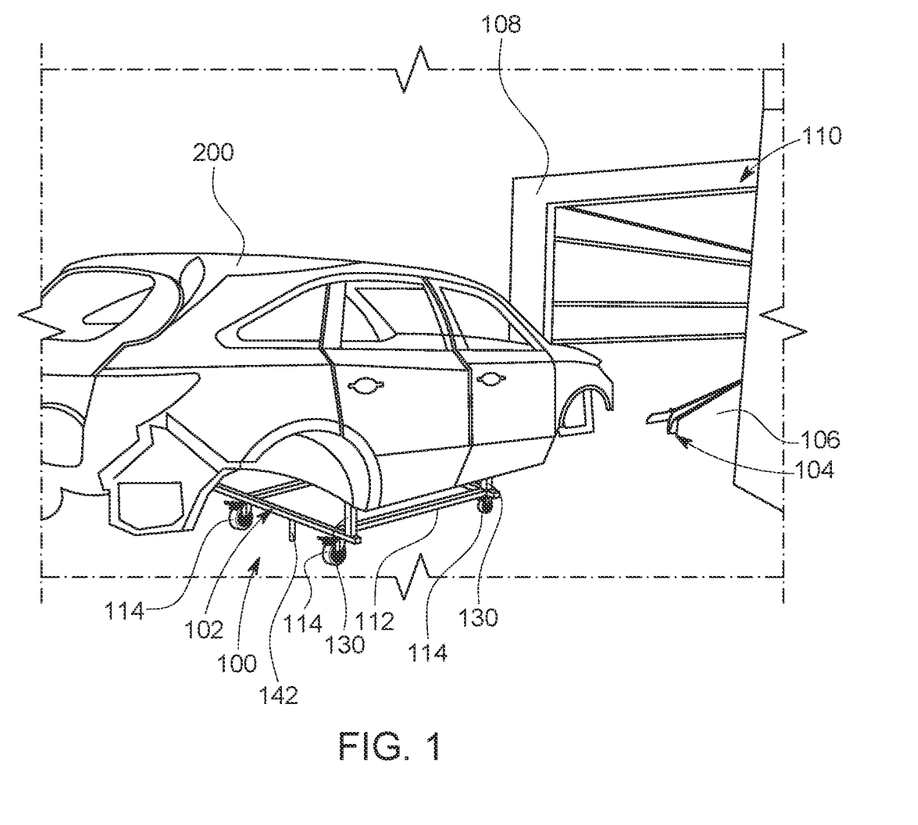
FIG. 1 is a perspective view depicting a transport system having a guide rail arrange inside a trailer and a vehicle body mounted on a carriage of the transport system, in accordance with one embodiment of the present disclosure.

FIG. 1 illustrates a perspective view of a transport system 100 for transporting a vehicle body 200, for example, a car body, from one location to another location at a manufacturing or assembling plant. The transport system 100 includes a carriage 102 adapted to support the vehicle body 200 and configured to facilitate a movement and transfer of the vehicle body 200 and a guide rail 104 to guide the movement of the carriage 102 and mounted on or attached to a base surface 106 (i.e., floor 106) of a trailer 108 of a truck 110 of the transport system 100.

Figure 3:
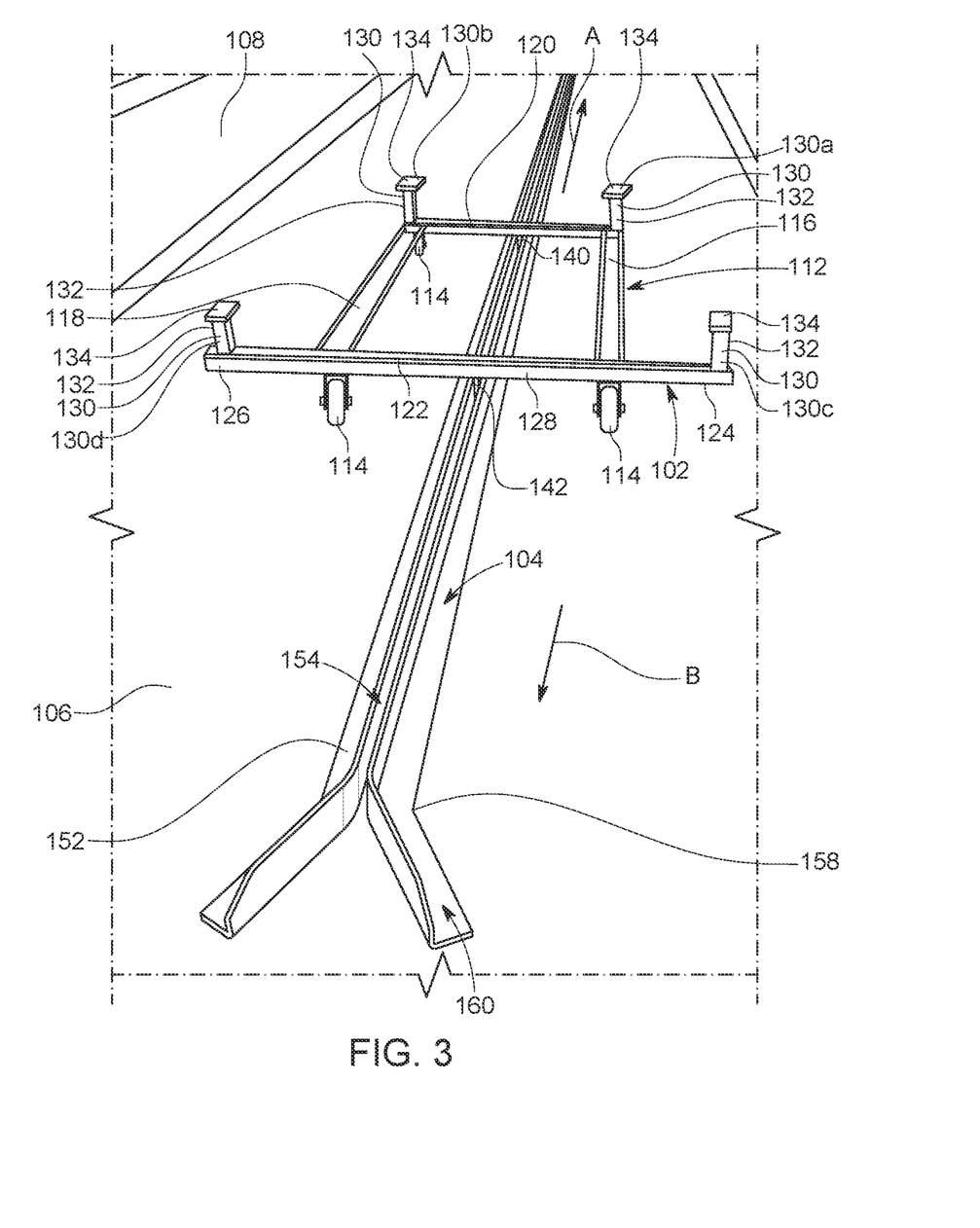
FIG. 3 is a top perspective view of the transport system depicting the carriage engaged with the guide rail and disposed inside the trailer with the vehicle body removed, in accordance with the concepts of the present disclosure.

Referring to FIG. 1 and FIG. 3, the carriage is adapted to transfer the vehicle body 200 to the trailer 106 from a shop floor, and includes a base frame 112, a plurality of traction members 114, for example, wheels 114, supporting the base frame 112 on a surface, for example, a ground surface of assembling plant or the base surface 106 of the trailer 108, and facilitates the movement of the carriage 102 on the surface. As shown, the base frame 112 includes a pair of longitudinal members, for example a first longitudinal member 116 and a second longitudinal member 118, arranged spaced apart and substantially parallel to each other and a pair of lateral members, for example, a first lateral member 120 and a second lateral member 122, connected to the longitudinal members 116, 118 and arranged spaced apart and substantially parallel to each other. The first lateral member 120 is arranged at a front of the carriage 102 and may extend substantially perpendicularly to the longitudinal members 116, 118. As shown, the first lateral member 120 is arranged between the first longitudinal member 116 and the second longitudinal member 118. Further, the second lateral member 122 is arranged at a rear of the carriage 102 and may include a first portion 124 extending outwardly of the first longitudinal member 116, a second portion 126 extending outwardly of the second longitudinal member 118, and a third portion 128 extending between the first longitudinal member 116 and the second longitudinal member 118. Accordingly, the first portion 124 and the second portion 126 defines overhanging portion of the second lateral member 122. The third portion 128 is arranged between the first longitudinal member 116 and the second longitudinal member 118, and extends from the first longitudinal member 116 to the second longitudinal member 118. In some embodiments, the first portion 124 and the second portion 126 of the second lateral member 122 may be omitted.

Moreover, the carriage 102 includes a plurality of support structures 130, for example, four support structures 130a, 130b, 130c, 130d extending upwardly in a vertical direction from the base frame 112 and adapted to support the vehicle body 200. As shown, the plurality of support structures 130 includes a first pair of support structures 130a, 130b arranged at the front of the carriage 102 and connected to the first lateral member 120 and a second pair of support structures 130c, 130d arranged at the rear of the carriage 102 and connected to the second lateral member 122. Each support structure 130 includes a support column 132 extending substantially perpendicularly and outwardly (i.e., upwardly) of the associated lateral member 120, 122, and a plate structure 134 attached to a top end of the support column 132 and arranged substantially horizontally and parallel to the surface. It may be appreciated that the vehicle body 200 abuts and rests on the plate structure 134 of the each of the support structure 130.

Figure 4:
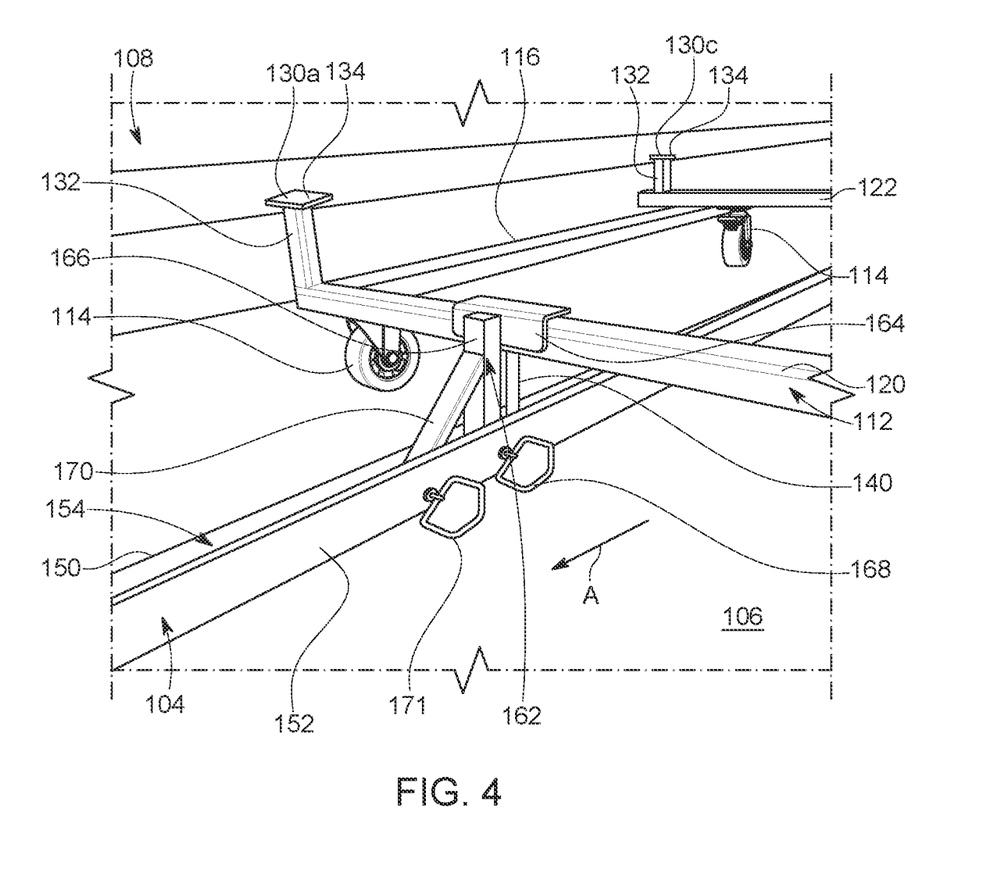
FIG. 4 is an enlarged front perspective view of the transport system depicting a first stopper engaged with the guide rail and the carriage, in accordance with the concepts of the present disclosure.

Additionally, referring to FIG. 4, the carriage 102 includes at least one guide pin, for example, a guide pin 140 (hereinafter referred to as a first guide pin 140) attached to the first lateral member 120 and is arranged between the first longitudinal member 116 and the second longitudinal member 118. As shown, the first guide pin 140 is located substantially centrally of the first lateral member 120 and extends downwardly from the first lateral member 120 and includes a free edge arranged at a gap from the surface on which the carriage 102 moves. The first guide pin 140 is adapted to engage with the guide rail 104 and facilitates a guiding of the carriage 102 along the guide rail 104. Similar to first guide pin 140, referring to FIG. 1 and FIG. 5, the carriage 102 include a second guide pin 142 attached to the second lateral member 122 and is arranged between the first longitudinal member 116 and the second longitudinal member 118. As shown, the second guide pin 142 in located substantially centrally to the second lateral member 122 and extends downwardly from the second lateral member 122 and includes a free edge arranged at a gap from the surface on which the carriage 102 moves. The second guide pin 142 is adapted to engage with the guide rail 104 and facilitates the guiding of the carriage 102 along the guide rail 104. As shown, the second guide pin is connected to the third portion 128 of the second lateral member 122.

Figure 5:
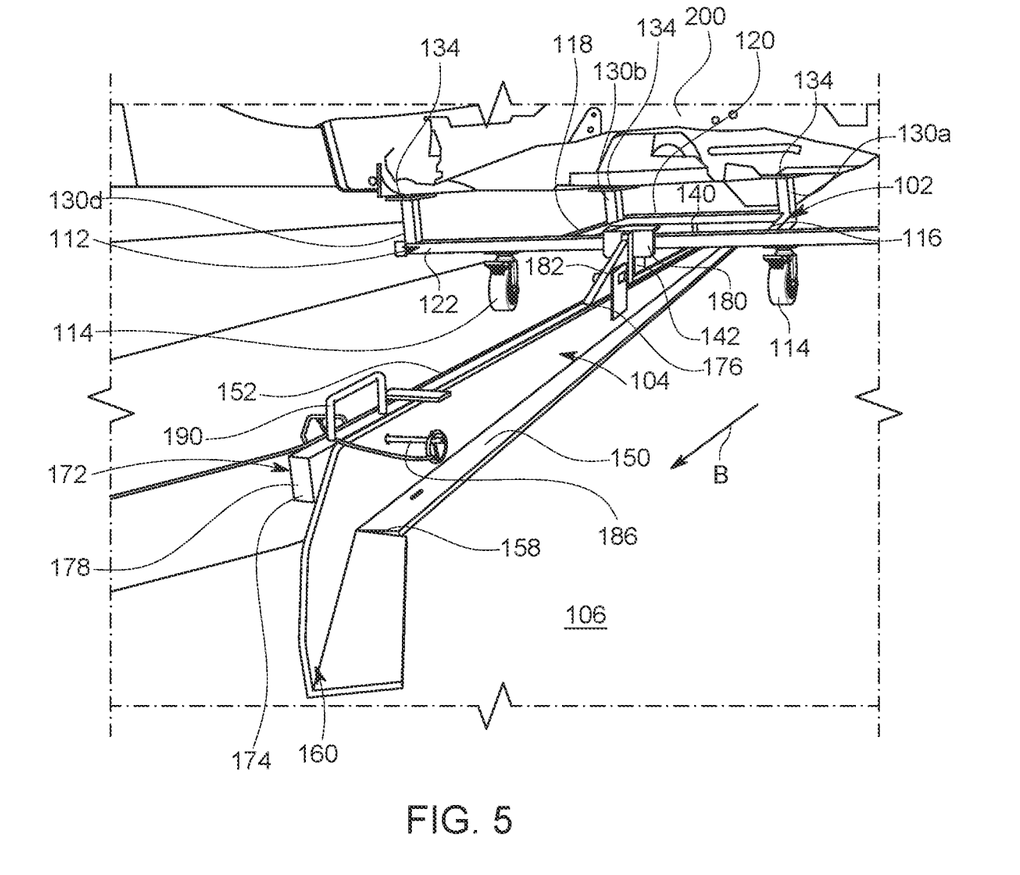
FIG. 5 is an enlarged rear perspective view of the transport system depicting a second stopper engaged with the guide rail and the carriage, in accordance with the concepts of the present disclosure.
Figure 6:
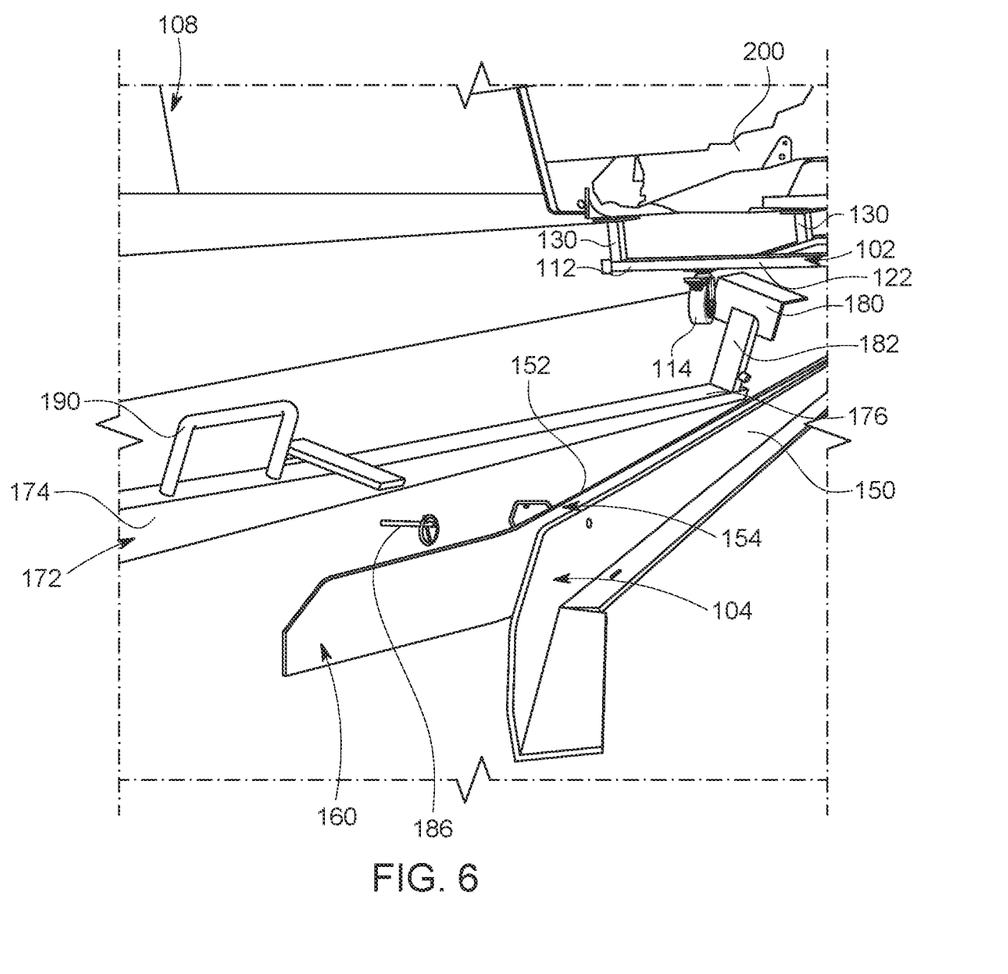
FIG. 6 is an enlarged rear perspective view of the transport system depicting a second stopper removed from the guide rail and disengaged from the carriage, in accordance with the concepts of the present disclosure.

Again referring to FIG. 3, the guide rail 104 is attached to the base surface 106 of the trailer 108 is shown. The guide rail 104 may be removably or fixedly attached to the base surface 106 and includes a pair of elongated channels 150, 152 arranged at a gap from each other, thereby defines an elongated passage 154 therebetween. The guide rail 104 includes a first longitudinal end 156 (shown in FIG. 4) arranged proximate to a front of the trailer 108, and a second longitudinal end 158 (shown in FIG. 5) arranged proximate to a rear of the trailer 108. As shown in FIG. 6, the guide rail 104 is arranged substantially centrally to a width of the trailer 108 and is adapted to engage with the first guide pin 140 and the second guide pin 142 of the carriage 102. As shown in FIGS. 4 and 5. the first guide pin 140 and the second guide pin 142 extend inside the elongated passage 154 and guide or enable the movement of the carriage 102 in a first direction, i.e., along a length of the guide rail 104, only, thereby facilitates in a correct/desired positioning of the carriage 102 inside the trailer 108. Also, the guide rail 104 prevents a motion of the carriage 102 in any direction other than along the length of the guide rail 104. Further, to enable a smooth engagement of the first guide pin 140 and the second guide pin 142 with the guide rail 104, the guide rail 104 may include a catch portion 160 arranged at the second longitudinal end 158. As shown, the catch portion 160 may include a V-shaped configuration, and facilitates an easy and smooth entry of the guide pins 140, 142 into the elongated passage 154. The catch portion 160 extends longitudinally and outwardly of the elongated passage 154 and a width of the catch portion 160 increases in a direction away from the elongated passage 154.

To lock the carriage 102 with the guide rail 104 at the desired position and to prevent any additional forward movement (i.e., in a first direction 'A') of the carriage 102 relative to the guide rail 104 along the length of the guide rail 104, the transport system 100 includes a first stopper 162 (shown in FIG. 4) removably engaged with the guide rail 104 and extending partially inside the elongated passage 154. As shown in FIG. 4, the first stopper is arranged at a location proximate to the first longitudinal end 156 of the guide rail 104 and abutting the first lateral member 120 of the base frame 112. The first stopper 162 includes a first bracket 164 adapted to abut the first lateral member 120, a pillar 166 attached to the first bracket 164 and extending outwardly of the first bracket 164 and adapted to be at least partially arranged inside the elongated passage 154 when the first stopper 162 is engaged with the guide rail 104. The first bracket 164 includes a substantially inverted L-shaped structure, and the pillar 166 is engaged with the elongated channels 150, 152 via a lock pin 168 that extends through the pillar 166 and the elongated channels 150, 152. Also, the first stopper 162 may include a reinforcement bar 170 extending obliquely and downwardly from the pillar 166 and from a location proximate to a junction of the first bracket 164 with the pillar 166. The reinforcement bar 170 also partly extends inside the elongated passage 154 when the first stopper 162 is engaged with the guide rail 104. The reinforcement bar 170 is engaged/locked with the elongated channels 150, 152 via a lock pin 171 that extends through the reinforcement bar 170 and the elongated channels 150, 152.

Further, to prevent any rearward movement (i.e., in a direction 'B') of the carriage 102 relative to the guide rail 104, the transport system 100 includes a second stopper 172 (shown in FIG. 5) adapted to be removably engaged with the guide rail 104 and adapted to extend partially inside the elongated passage 154. As shown in FIG. 5, the second stopper 172 is arranged to abut the second lateral member 122 of the base frame 112 and includes a base rod 174 adapted to extends inside the elongated passage 154 and having a first longitudinal end 176 and a second longitudinal end 178, a second bracket 180 adapted to engaged with the second lateral member 122, and a connecting member 182 connecting the base rod 174 to the second bracket 180. As shown, the second bracket 180 includes a substantially inverted L-shaped structure and is arranged at the first longitudinal end 176 of the base rod 174. The connecting member 182 extends vertically from the base rod 174 to the second bracket 180. Further, the second longitudinal end 178 of the base rod 174 is arranged proximate to the catch portion 160 of the guide rail 104 when the second stopper 172 is engaged with the carriage 102 and the guide rail 104 to prevent the rearward motion of the carriage 102. Further, the base rod 174 is engaged/locked with the elongated channels 150, 152 via a lock pin 186 that extends through the base rod 174 and the elongated channels 150, 152. Also, the second stopper 172 may include a handle 190 arranged proximate to the second longitudinal end 178 of the base rod 174 and may be coupled with the base rod 174. The handle 190 facilitates an easy engagement of the second stopper 172 with the guide rail 104 and the carriage 102 as well as an easy removal of the second stopper 172 (i.e., the base rod 174) from the guide rail 104 (i.e., the elongated passage 154).

A method for transporting the vehicle body 200 from one location to another location at the manufacturing plant is now explained. The method includes providing the trailer 108 having the guide rail 104 arranged on the base surface 106 of the trailer 108 and positioning the trailer 108 at an appropriate location at the manufacturing plant. The method also includes arranging the vehicle body 200 on the carriage 102 such that the vehicle body 200 is supported on the support structures 130 of the carriage 102. The vehicle body 200 is coupled with the carriage 102 by connecting the support structures 130 with the vehicle body 200 using suitable fasteners or any other suitable means known in the art. Thereafter, the method includes moving the carriage 102 to arrange the carriage 102 with the vehicle body 200 inside the trailer 108. The carriage 102 is moved inside the trailer 108 such that the first guide pin 140 moves inside the catch portion 160 and then moves inside the elongated passage 154 of the guide rail 104.

Figure 2:
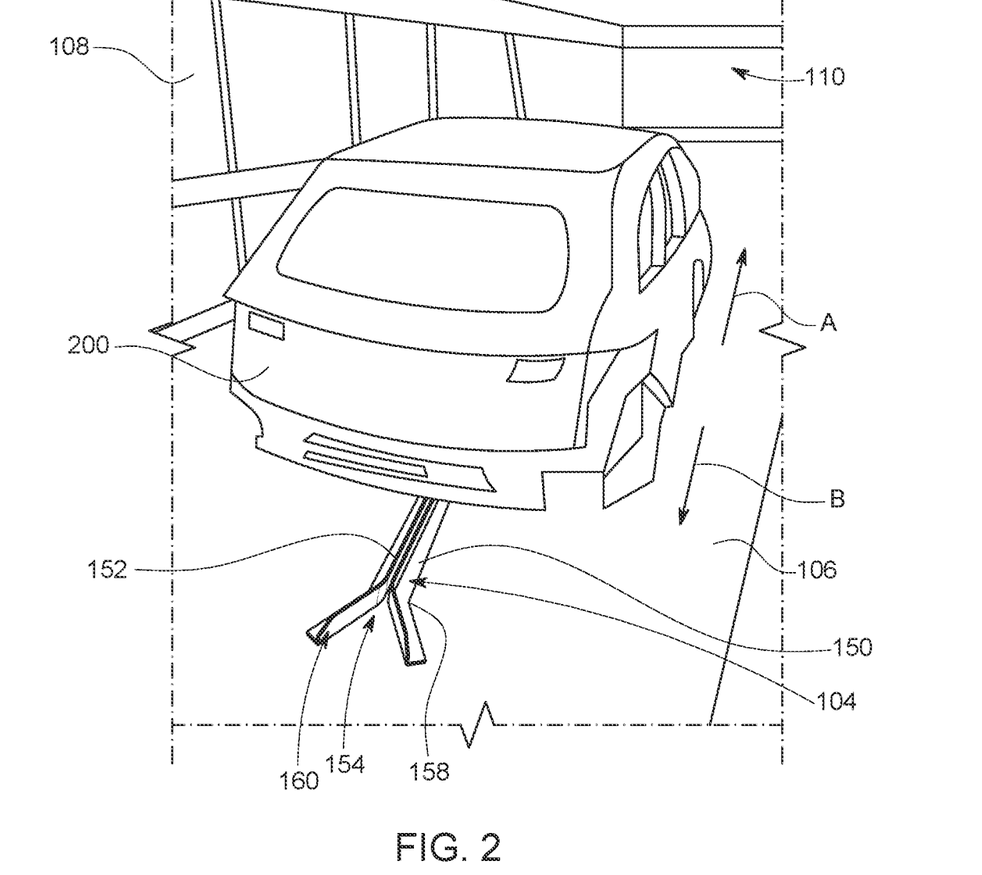
FIG. 2 is perspective view the vehicle body arranged inside the trailer of the transport system, in accordance with the concepts of the present disclosure.

As the carriage 102 is further moved inside the trailer 108, the first guide pin 140 moves along the elongated passage 154 and the second guide pin 142 enters the elongated passage 154. In this manner, the carriage 102 is guided long the guide rail 104 and is positioned at an appropriate location inside the trailer 108 (as shown in FIG. 2). Before moving the carriage 102 inside the trailer 108, the first stopper 162 is engaged with the guide rail 104. Accordingly, as the carriage 102 is moved along the guide rail 104, the first lateral member 120 of the base frame 112 of the carriage 102 contacts and abuts the first bracket 164 of the first stopper 162. Accordingly, any additional forward movement of the carriage 102 inside the trailer 108 is prevented. Subsequently, the second stopper 172 is engaged and locked with the guide rail 104 and the second lateral member 122 of the carriage 102 to prevent any rearward movement of the carriage 102 inside the trailer 108. In this manner, the vehicle body 200 is arranged inside the trailer 108 for transportation and does not require any additional adjustment by the operator. Also, as the vehicle body 200 is attached to the carriage 102, a strapping of the vehicle body 200 with the trailer 108 is not needed.

What is claimed is:

1. A transport system for transporting a vehicle body at a manufacturing plant, the transport system comprising:
    a guide rail attached to a floor of a trailer of a truck and including a pair of elongated channels defining an elongated passage therebetween;
    a first stopper is coupled with the guide rail via a lock pin extending through the pair of elongated channels and the first stopper;
    a second stopper adapted to be removably coupled with the guide rail and configured to engage with a carriage to restrict the movement of the carriage in a second direction along the length of the guide rail, the second stopper is adapted to be partially arranged inside the elongated passage;
    the second stopper includes a base rod adapted to be arranged inside the elongated passage and a second bracket adapted to be engaged with the carriage to prevent the movement of the carriage in the second direction;
    the second stopper is coupled with the guide rail via the lock pin extending through the pair of elongated channels and the base rod; and
    the carriage adapted to support the vehicle body and to facilitate a transfer of the vehicle body to the trailer, the carriage includes at least one guide pin configured to engage with the guide rail and adapted to be arranged inside the elongated passage, wherein the at least one guide pin guides a movement of the carriage along the guide rail.

2. The transport system of claim 1, wherein the first stopper includes a first bracket adapted to engaged with the carriage to prevent the movement of the carriage in the first direction.

3. The transport system of claim 1, wherein
    the carriage includes a base frame supported on wheels, the base frame includes a pair of lateral members arranged spaced apart and substantially parallel to each other, and
    the at least one guide pin includes a first guide pin coupled to a first lateral member of the pair of lateral members and extending downwardly of the first lateral member and a second guide pin coupled to a second lateral member of the pair of lateral members and extending downwardly of the second lateral member.

4. The transport system of claim 3, wherein the carriage further includes a plurality of support structures with a support column extending upwardly in a vertical direction from the base frame coupled to the base frame, wherein the vehicle body is mounted and supported on the support structures.

5. The transport system of claim 1, wherein the guide rail includes a catch portion to enable an engagement of the at least one guide pin with the guide rail, wherein the catch portion includes a substantially V-shaped configuration to enable an entry of the at least one guide pin inside the elongated passage.

6. A transport system for transporting a vehicle body at a manufacturing plant, the transport system comprising:
    a trailer including a floor;
    a guide rail attached to the floor of the trailer and including a pair of elongated channels defining an elongated passage therebetween;
    a carriage adapted to support the vehicle body and to facilitate a transfer of the vehicle body to the trailer, the carriage includes at least one guide pin configured to engage with the guide rail and adapted to be arranged inside the elongated passage; wherein the at least one guide pin guides a movement of the carriage along the guide rail;
    a first stopper adapted to be removably coupled with the guide rail and configured to engage with the carriage to restrict the movement of the carriage in a first direction along the length of the guide rail, the first stopper is adapted to be partially arranged inside the elongated passage;
    the first stopper is coupled with the guide rail via a lock pin extending through the pair of elongated channels and the first stopper;
    the first stopper includes a first bracket adapted to engaged with the carriage to prevent the movement of the carriage in the first direction;
    a second stopper includes a base rod adapted to be arranged inside the elongated passage and a second bracket adapted to be engaged with the carriage to prevent the movement of the carriage in the second direction,
    the second stopper is coupled with the guide rail via the lock pin extending through the pair of elongated channels and the base rod; and
    the second stopper adapted to be removably coupled with the guide rail and configured to engage with the carriage to restrict the movement of the carriage in a second direction, opposite to the first direction, along the length of the guide rail, the second stopper is adapted to be partially arranged inside the elongated passage.

7. The transport system of claim 6, wherein
    the carriage includes a base frame supported on a wheels, the base frame includes a pair of lateral members arranged spaced apart and substantially parallel to each other, and
    the at least one guide pin includes a first guide pin coupled to a first lateral member of the pair of lateral members and extending downwardly of the first lateral member and a second guide pin coupled to a second lateral member of the pair of lateral members and extending downwardly of the second lateral member.

8. The transport system of claim 7, wherein the carriage further includes a plurality of support structures with a support column extending upwardly in a vertical direction from the base frame coupled to the base frame, wherein the vehicle body is mounted and supported on the support structures.

9. The transport system of claim 6, wherein the guide rail includes a catch portion to enable an engagement of the at least one guide pin with the guide rail, wherein the catch portion includes a substantially V-shaped configuration to enable an entry of the at least one guide pin inside the elongated passage.

10. A method for transporting a vehicle body at a manufacturing plant, the method comprising:
    providing a trailer having a guide rail attached to a floor of the trailer, the guide rail includes a pair of elongated channels defining an elongated passage therebetween;
    providing a carriage to support the vehicle body and to facilitate a transfer of the vehicle body to the trailer, the carriage includes at least one guide pin configured to engage with the guide rail and adapted to be arranged inside the elongated passage, wherein the at least one guide pin guides a movement of the carriage along the guide rail;
    mounting the vehicle body on the carriage and positioning the carriage along with the vehicle body inside the trailer by moving the carriage on the trailer such that the at least one guide pin engages with the guide rail and is arranged inside the elongated passage;
    coupling a first stopper having a first bracket to the guide rail with a lock pin extending through the pair of elongated channels and the first stopper;
    engaging the first bracket of the first stopper with the guide rail and the carriage to prevent the movement of the carriage in a first direction along the length of the guide rail;
    coupling a second stopper having a base rod inside the elongated channel to the guide rail with a lock pin extending through the pair of elongated channels and the base rod; and
    engaging a second bracket of the second stopper with the guide rail and the carriage to prevent the movement of the carriage in a second direction opposite to the first direction.

11. The method of claim 10, wherein the carriage includes a base frame supported on a plurality of wheels, the base frame includes a pair of lateral members arranged spaced apart and substantially parallel to each other, and
    the first stopper is engaged with a first lateral member of the pair of lateral members and the second stopper is engaged with a second lateral member of the pair of lateral members.

* * * * *